United States Patent
Shimada et al.

(10) Patent No.: US 6,800,387 B2
(45) Date of Patent: Oct. 5, 2004

(54) FUEL CELL SYSTEM AND METHOD FOR OPERATING THE SAME

(75) Inventors: Toshiaki Shimada, Saitama (JP); Yoshio Nuiya, Saitama (JP); Takahiro Kuriiwa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 316 days.

(21) Appl. No.: 10/137,848

(22) Filed: May 1, 2002

(65) Prior Publication Data

US 2002/0172845 A1 Nov. 21, 2002

(30) Foreign Application Priority Data

May 1, 2001 (JP) .................................. P2001-134123

(51) Int. Cl.[7] ............................................... H01M 8/06
(52) U.S. Cl. ............................. 429/17; 429/19; 429/20
(58) Field of Search ............................. 429/17, 19, 20

(56) References Cited

U.S. PATENT DOCUMENTS 6,715,571 B2 * 4/2004 Nakamori .................. 180/65.1

2001/0031386 A1 * 10/2001 Sugawara ..................... 429/19
2002/0114984 A1 * 8/2002 Edlund et al. ................ 429/19

FOREIGN PATENT DOCUMENTS

JP          2000-67898          3/2000

* cited by examiner

Primary Examiner—John S. Maples
(74) Attorney, Agent, or Firm—Lahive & Cockfield, LLP; Anthony A. Laurentano

(57) ABSTRACT

In a fuel cell system 4 in which electricity is generated by a fuel cell 4 supplied with the hydrogen gas created from a reforming reaction and the electricity is supplied to an external load 12, an electric buffer CAPA for storing surplus electricity or supplementing insufficient electricity is located between the fuel cell 4 and the external load 12, and a hydrogen buffer MHB for accommodating surplus hydrogen gas and supplementing insufficient hydrogen gas is located between a reforming device 2 and the fuel cell. Where electricity consumption in the load 12 increases abruptly, necessary electricity is supplied with the assistance of the electric buffer CAPA and hydrogen buffer HMB.

7 Claims, 9 Drawing Sheets

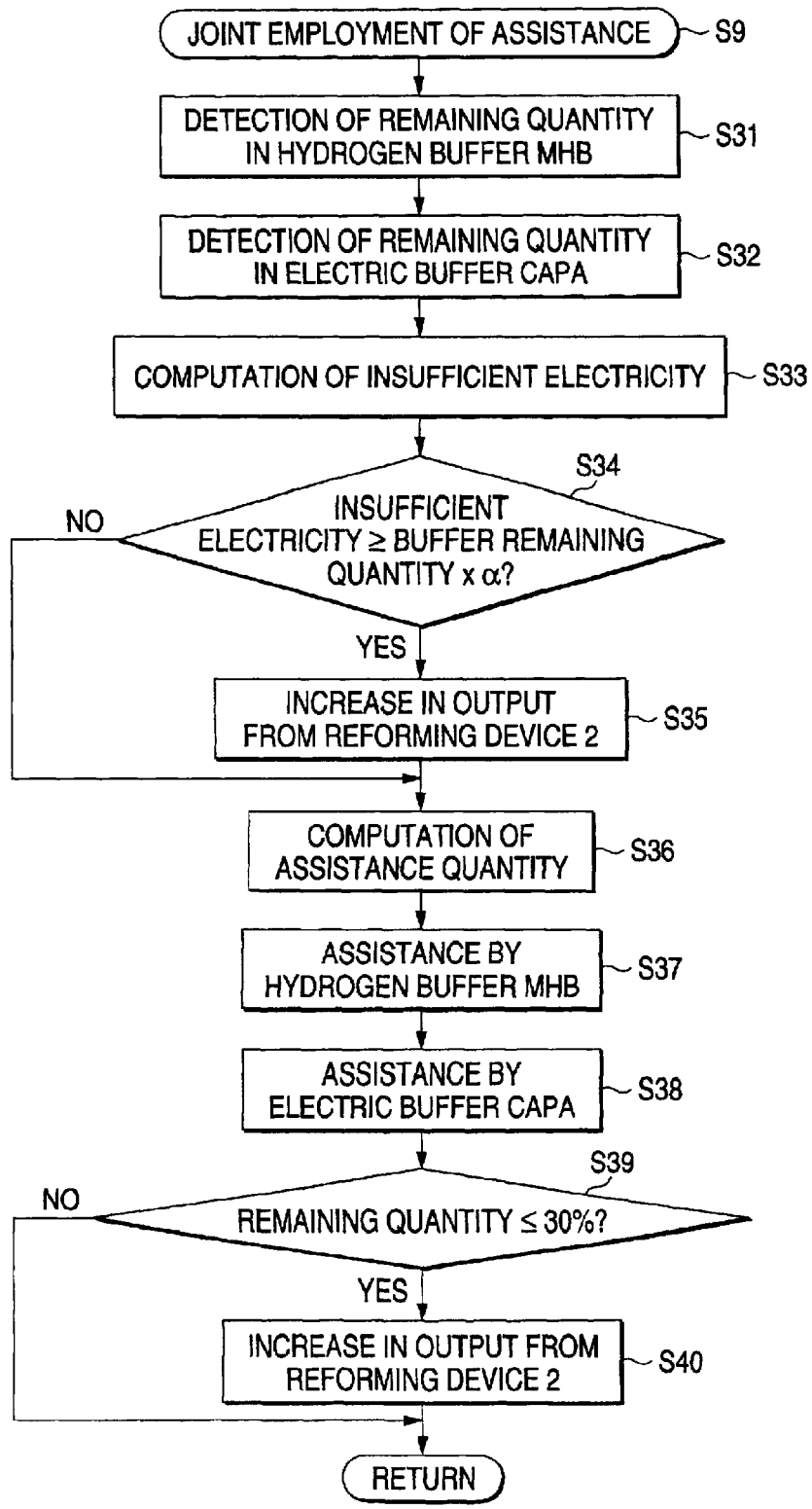

FUEL CELL SYSTEM AND METHOD FOR OPERATING THE SAME

BACKGROUND OF THE INVENTION

1. Field of the Invention

The invention relates to a fuel cell system for generating an electricity using a hydrogen gas and a method for operating the same.

2. Description of the Related Art

In recent years, under consideration of the environment, a vehicle has been developed which uses electricity generated by a fuel cell as a power source. The fuel cell system loaded in such a vehicle is preferably compact in size, light in weight and high in the efficiency of using energy. An example of the related art viewed from this standpoint is disclosed in JP-A-2000-67898.

The fuel cell system described in JP-A-2000-67898 is to cause a hydrogen occluding alloy in a hydrogen storing means to occlude the hydrogen not consumed by and exhausted from a fuel cell or a reformed hydrogen gas from a reforming device.

However, the hydrogen storing means provides a time lag from the electrochemical reaction in the fuel cell to the extraction of a current. Such a fuel cell system cannot swiftly increase supplied electricity according to an increase in a required output, and hence could not give sufficient transition response.

The fuel cell system with insufficient transition response requires a long time taken from when a driver operates an accelerator to when the vehicle is actually accelerated or decelerated. If the quantity to be treated by a reforming device is excessively increased or decreased in order to improve the transition response, the burden is given to the fuel cell system.

SUMMARY OF THE INVENTION

It is an object of the invention to optimize the generating efficiency of the fuel cell system so that a hydrogen gas and energy are efficiently used to enhance the response to an output change.

In order to solve the problem described above, the invention is a fuel cell system including a fuel cell capable of supplying an electricity generated by an electrochemical reaction of a hydrogen gas and an oxygen gas to a load and a reforming device for creating the hydrogen gas to be supplied to the fuel cell by a reforming reaction, comprising:

an electric buffer for charging an electricity supplied by the fuel cell; and a hydrogen buffer for accommodating the hydrogen gas supplied by the reforming device; characterized in that the quantity of the hydrogen gas corresponding to the generated electricity in the fuel cell is served by the quantity of the hydrogen gas discharged by the reforming device and the hydrogen buffer, and the electricity required by the load is served by the generated electricity of the fuel cell and the electricity discharged from the electric buffer.

In this fuel cell system, where the necessary electricity cannot be supplied with the aid of only the hydrogen gas supplied from the reforming device (e.g. reformer) during the transient period while the output changes, until the hydrogen gas supplied from the reforming device increases, the hydrogen gas previously accommodated in the hydrogen buffer is supplied to the fuel cell, and/or the electric energy previously stored in the electric buffer is supplied to the load, thereby serving the necessary electricity. On the other hand, the electricity generated owing to the hydrogen gas from the reforming device is surplus, the surplus electricity is filled in the electric buffer and the surplus hydrogen gas is accommodated. Such preparation for a next output change permits the energy to be employed effectively.

The invention is a fuel cell system, characterized in that when the necessary electricity consumed by the load increases, discharging of the electricity from the electric buffer is done preferentially to that of the hydrogen gas from the hydrogen buffer.

In this fuel cell system, since the electric buffer having the highest response to an increase in the necessary electricity is preferentially employed, the transition response of the fuel cell equipped electric vehicle can be improved.

The invention is a fuel cell system, characterized in that the hydrogen gas is discharged from the hydrogen buffer according to the remaining quantity of the electric energy stored in the electric buffer.

In this fuel cell system, since the hydrogen gas supplied from the hydrogen buffer with low response but high energy density is increased according to the remaining quantity of the electric buffer with a low energy density, the electricity can be supplied stably to serve the necessary electricity for the load.

Further, the invention is a fuel cell system, characterized in that the hydrogen gas is discharged from the reforming device according to the remaining quantity of the hydrogen gas accommodated in the hydrogen buffer.

In this fuel cell geminating system, where the necessary electricity cannot be served by the electricity generated by the fuel cell with the aid of the hydrogen buffer, the hydrogen gas supplied from the reforming device with the lowest response but high stability is increased, thereby continuing to supply the necessary electricity surely.

In accordance with this invention, there is provided a method of operating a fuel cell system wherein the electricity generated by a fuel cell by an electrochemical reaction of a hydrogen gas obtained from a reforming reaction in are forming device and an oxygen gas is supplied to a load; a necessary electricity consumed by the load and the electricity corresponding to excess/shortage of the electricity supplied from the fuel cell are charged in or discharge from an electric buffer; and the hydrogen gas corresponding to the excess/shortage in the quantity of the necessary hydrogen gas for the fuel cell and the quantity of the hydrogen gas supplied from the reforming device is charged in or discharged from a hydrogen buffer accommodating a hydrogen occluding alloy, characterized in that when the necessary electricity increases, after the electricity supplied from the electric buffer to the load has been increased, the quantity of the hydrogen gas supplied from the hydrogen buffer to the fuel cell is increased and the electricity generated by the fuel cell is increased, thereby serving the necessary electricity.

In this method of operating a fuel cell system, when the necessary electricity is increased, at an initial time, the electricity is supplied to the load from the electric buffer with the highest response to enhance the transition response. Next, the generated electricity is increased with the aid of the hydrogen gas supplied from the hydrogen buffer with the high energy density so that the electricity supply can be can be done stably.

The is a method of operating a fuel cell system, wherein after the quantity of the hydrogen gas supplied from the hydrogen buffer has been increased, the quantity of the hydrogen gas supplied from the reforming device so that the electricity generated by the fuel cell is increased to serve the necessary electricity.

In the method of operating of a fuel cell system, after the response of electricity supply in the transient time while the necessary electricity increases has been enhanced with the aid of the electric buffer and hydrogen buffer, the hydrogen gas supplied from the reforming device is increased so that the electricity supply can be done stably.

BRIEF DESCRIPTION OF THE DRAWINGS

FIG. 5 is a flowchart showing the details of a part of FIG. 3.

DESCRIPTION OF THE PREFERRED EMBODIMENTS

Figure 1:
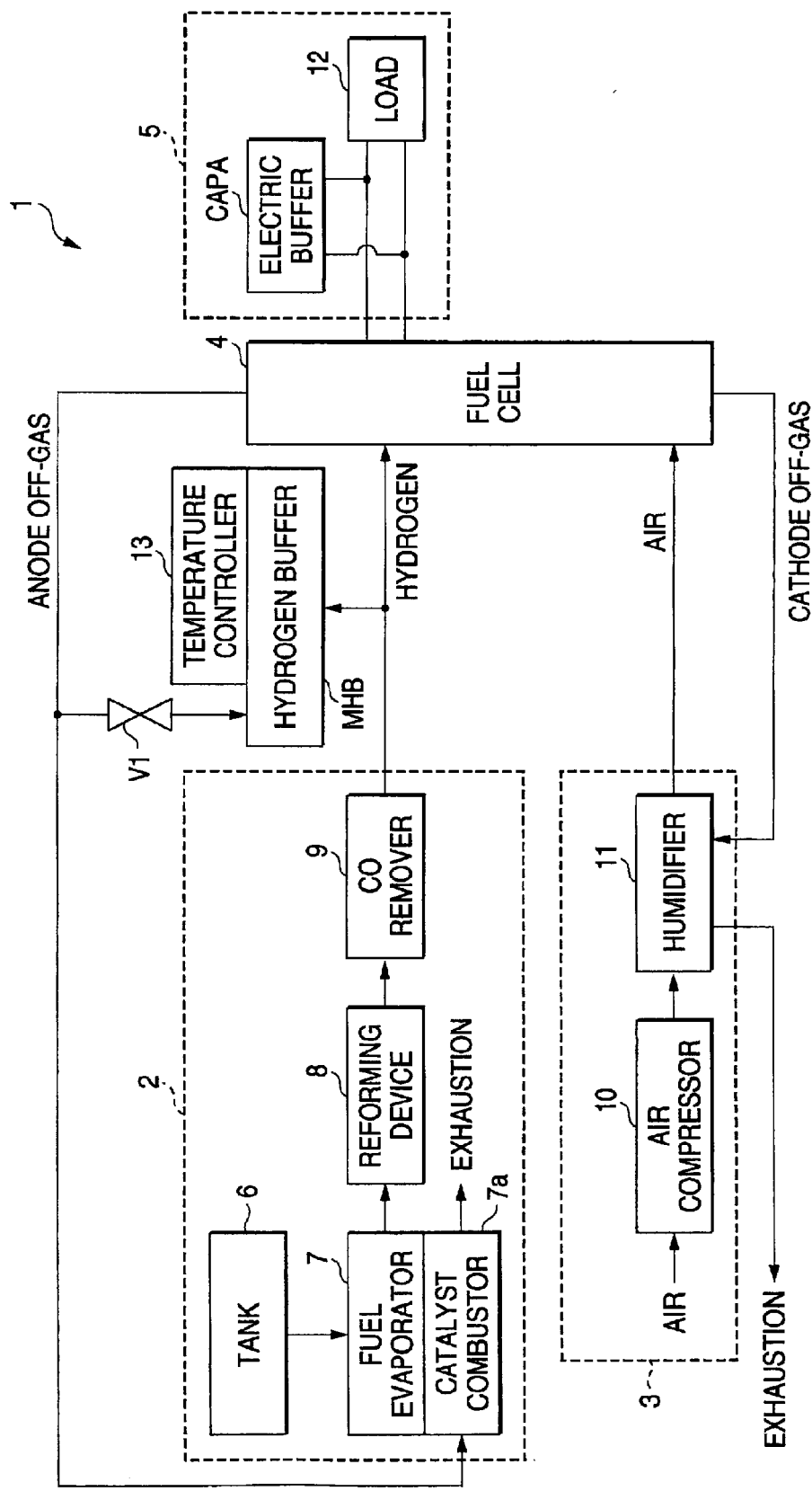
FIG. 1 is a block diagram showing an arrangement the fuel cell system according to an embodiment of this invention.

Now referring to the drawings, a detailed explanation will be given of embodiments of this invention.

A block diagram of the entire arrangement of a fuel cell system is shown in FIG. 1. A fuel cell system 1 is to make an electrochemical reaction of a hydrogen gas produced from a liquid raw fuel reformed by a reforming device 2 and an oxygen gas included in the air supplied from an air supplying device 3 to take out electric energy. A fuel cell 4 supplies the electric energy to a electricity supplying line 5 inclusive of a motor and others.

The fuel cell 4 has a plurality of cells. Each of the cells sandwiches a solid polymer electrolyte membrane of a perphlorocarbon sulfonic acid membrane or the like between an anode side electrode and a cathode side electrode.
The hydrogen gas supplied to the anode side electrode of each cell is protonized (ionized) by a platinum catalyst. The ionized hydrogen moves through the solid electrolyte to reach the cathode side electrode and reacts with the oxygen gas to produce water. The electrons generated when the hydrogen is protonized are taken out as a current. The produced water and non-reacted gas are exhausted as off-gas.

The reforming device 2 includes a tank 6 for storing a raw fuel of a mixed solution of water and methanol. The tank is connected in series to a fuel evaporator 7 for evaporating the raw fuel and air while mixing them, a reformer 8 for reforming a mixed gas of the evaporated water, methanol and air to create a hydrogen gas and a remover 9 for removing the carbon monoxide gas (CO) generated during the reformation. The hydrogen gas included in the reformed gas passed the CO remover 9 is supplied to the anode side electrode of the fuel cell 4. Apart thereof can be occluded by the hydrogen occluding alloy within a hydrogen buffer MHB which is located at an earlier stage than the fuel cell 4.

In this embodiment, the fuel evaporator 7 is provided with a catalyst combustor 7a for combusting the non-used hydrogen gas 9 included in the anode off-gas exhausted from the anode side electrode of the fuel cell 4. The fuel evaporator 7 serves to evaporate the raw fuel using the heat generated by the catalyst combustor 7a. Further, an air supplying line (not shown) capable of introducing an air for promoting a combustion of the hydrogen gas and adjusting the reaction is connected to each of the catalyst combustor 7a, reformer 8 and CO remover 9 of the reforming device 2.

The hydrogen buffer MHB includes a plurality of tanks (not shown) for occluding/discharging the hydrogen gas all the time. Each tank accommodates a hydrogen occluding alloy. The hydrogen buffer MHB is provided with a temperature control unit 13 for the controlling the temperature of each tank. The temperature control unit 13 serves to raise or lower the temperature of each tank so that the temperature control unit controls the occlusion and discharging of the hydrogen gas in the hydrogen occluding alloy. A cooling water for the fuel cell 4, an electric heater, an air-cooling means, cooling water for a radiator, etc may be used as the temperature control unit 13. The plurality of tanks of the hydrogen buffer MHB can be simultaneously prepared as tanks temperature-adjusted in an occludable state and in a dischargeable state. Therefore, a time lag due to the temperature change in the tanks is avoided. As occasion demands, each tank is temperature-adjusted to be replaced between an occluding state and discharging state. A control device 14 controls the tanks so that at least one tank is in the dischargeable state and at least one of another tanks is in the occuludable state.

The air supplying device 3 includes an air compressor 10 for pressurizing the air sucked from the atmosphere to a prescribed pressure and a humidifier 11 for humidifying the pressurized air using the cathode off-gas including a plenty of water exhausted from the cathode side electrode of the fuel cell 4. The air humidified by the humidifier 11 is supplied to the cathode side electrode of the fuel cell 4.

The electricity supplying line 5 incorporates a load 12 which includes a motor electrically connected the port for extracting the current from the fuel cell and auxiliary machines such as a vehicle air-conditioner, illuminating instruments, meters, etc. And an electric buffer CAPA which is connected to the fuel cell 4 in parallel to the load and can store surplus electricity. It should be noted that the control of the current to be extracted from the fuel cell 4 and the exchange of the electricity supply to the electric buffer CAPA are performed by a control circuit (not shown).

In this embodiment, the electric buffer CAPA may be an electrical double layer capacitor which has a capacity of e.g. 1 kWh. The electric buffer CAPA can store, as electric energy, a part of the electricity generated by the fuel cell 4 and regenerative energy when a vehicle is braked. At the time of starting the fuel cell system 1 or and during the transient period while the output changes, the response of the fuel cell system 1 is enhanced by supplying electricity from the electric buffer CAPA to the load 12 so that the time taken until the starting is shortened. Incidentally, the electric buffer CAPA is preferably provided with an electric converter for adjusting a electricity difference between the fuel cell 4 and the electric double layer capacitor.

Figure 2:
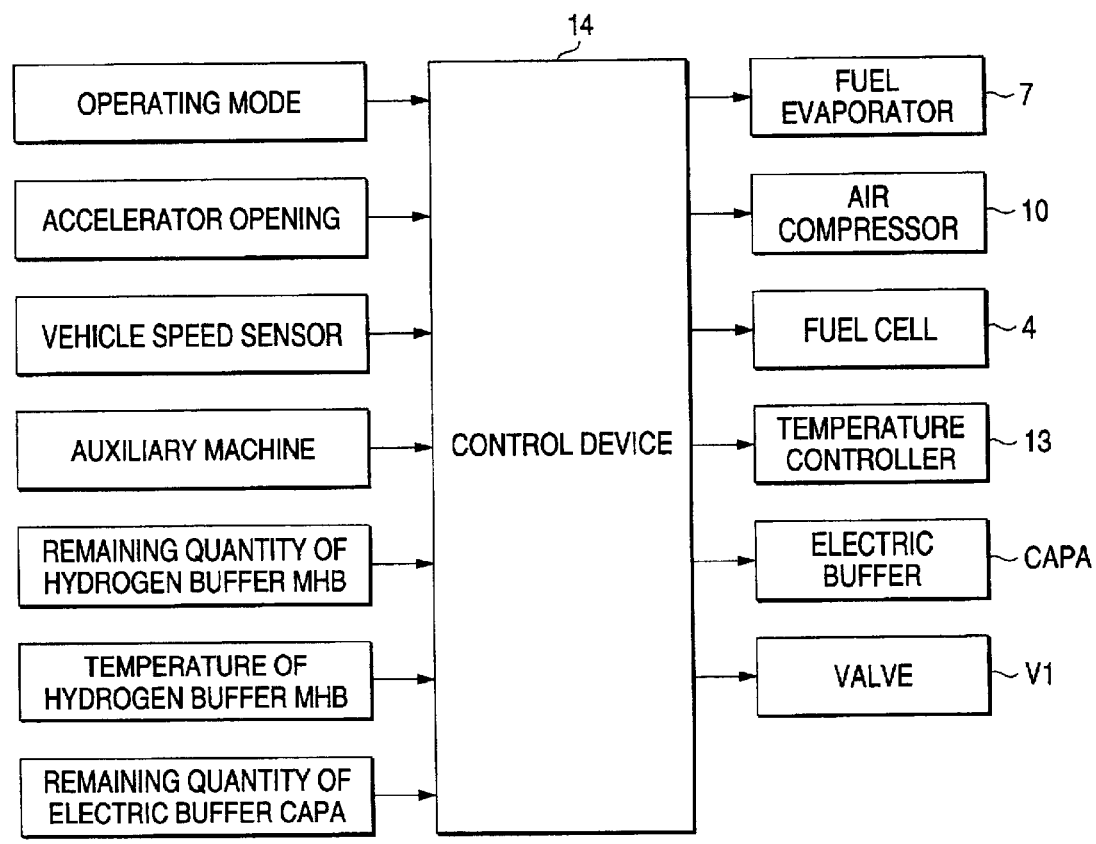
FIG. 2 is showing a view for explaining the control device.

The fuel cell system 1 according to this embodiment is controlled by the control device 14 as shown in FIG. 2. The control device 14 incorporates a CPU, ROM and predetermined electric/electronic circuit. A prescribed program is developed for these components to perform various kinds of processing. In this embodiment, in response to the selection of the operating mode described later, the opening of an accelerator, the value of a vehicle speed sensor of the vehicle and a starting signal for the auxiliary machine, etc., the control device 14 controls the raw fuel to be jet from the fuel evaporator 7. Each processing performed by the control device 14 will be explained with reference to the processing flow.

Referring to the flowchart of FIGS. 3, 4 and 5, an explanation will be given of the operating processing of the fuel cell system according to this embodiment. FIGS. 4 and 5 are flowcharts for explaining a part of the processing in FIG. 3 in detail. First, the control device 14 acquires the data of the operating mode selected by the driver in step S1 and sets the generating energy (base output) according to the operating mode in step S2. The operating mode is classified into general operating, operating (economy mode) putting higher premium on fuel economy, operating (sport mode) putting higher premium on accelerating efficacy than the fuel economy, etc. The base output can be acquired by e.g. retrieving the map prepared in the control device 14 at an address of each operating mode.

In step S3, the control device 14 causes the reforming device 2 to create the hydrogen gas with the quantity required for generating the base output set in the previous step and supply it to the fuel cell 4. The step S3 will be explained in more detail. First, the raw fuel with a quantity corresponding to that of the hydrogen gas which gives the base output is supplied from the tank 6. The raw fuel is evaporated by the fuel evaporator 7 to create vaporized fuel. The vaporized fuel is processed by the reformer to create reformed gas. The carbon monoxide contained in the reformed gas is removed by the CO remover 9. The resultant reformed gas is supplied to the fuel cell 4. The processing in step S3 is preferably subjected to the feedback control according to the quantity of the hydrogen gas at the rear stage of the CO remover 9 and/or the generated electricity of the fuel cell 4.

Next, the control device 14 detects the accelerator opening by an accelerating operation by the driver (Step S4), detects the vehicle speed from the vehicle speed sensor (step S5) and retrieves the map stored in itself to determine a necessary motor output. The control device 14 adds the electric power consumed by the various auxiliary machines and air-conditioner to the determined motor output to provide necessary electricity (step S6)

In step S7, if the control device 14 decides that the quantity of the hydrogen gas supplied by the reforming device 2 can give the necessary electricity (Yes), the processing proceeds to step S8 in which the electric power is supplied only by the electrochemical reaction of the hydrogen gas supplied from the reforming device 2. On the other hand, if the quantity of the hydrogen gas corresponding to the base output cannot give the necessary electricity (No), the processing proceeds to step S9 in which the base output is assisted by the hydrogen buffer MHB and/or electric buffer CAPA.

Now referring to the flowchart of FIG. 4, an explanation will be given of the electricity supply by only the reforming device 2.

First, in step S21, the control device 14 detects the quantity (remaining quantity) of the hydrogen gas accommodated in the hydrogen buffer MHB and in step S22, detects the quantity (remaining quantity) of the electric energy stored in the electric buffer CAPA.

The control device 14 computes the remaining electric power (surplus electricity) acquired by subtracting the necessary electricity consumed by the load 12 from the generated electricity of the fuel cell 4 (step S23). As occasion demands, the electricity corresponding to the regenerative energy acquired by regenerative braking is added to the surplus electricity.

Figure 6A:
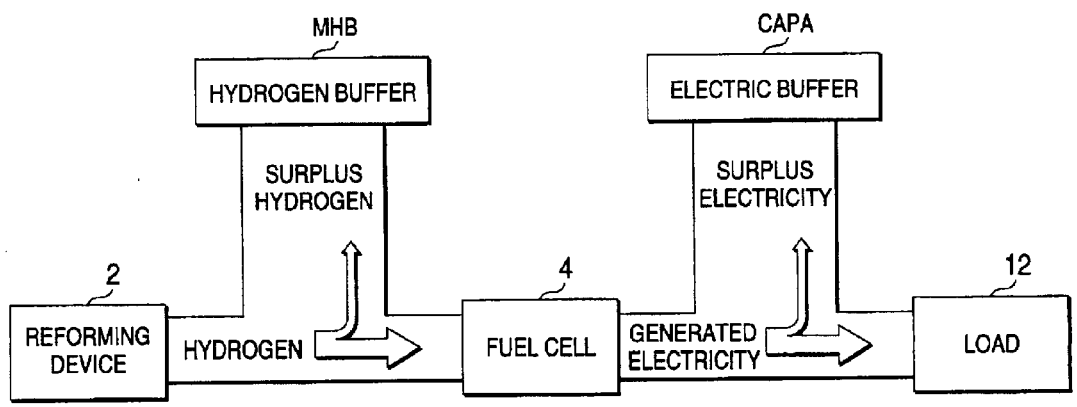
FIG. 6A is a conceptual view of filling for a hydrogen buffer and an electric buffer.

After the surplus electricity has been acquired, in step S24 to S26, as seen from FIG. 6A, a part of the hydrogen gas created in the reforming device will be accommodated in the hydrogen buffer MHB and a part of the electricity generated by the fuel cell 4 will be stored in the electric buffer CAPA.

First, on the basis of the respective remaining quantities, the control device 14 computes the permissible quantity of the hydrogen gas which can be accommodated in the hydrogen buffer MHB and that of the electric energy which can be stored in the electric buffer CAPA (step S24). On the basis of the computed results, the control device 14 adjusts the generated electricity of the fuel cell 4 in the manner of closing the flow rate control valve (not shown) provided at the anode side electrode of the fuel cell 4 to reduce the quantity of the hydrogen gas to be supplied (step S25).

Further, the control device 14 closes the circuit (not shown) of the electricity supplying line to connect the fuel cell 4 and the electric buffer CAPA. Then, the remaining electricity when the electricity consumed by the load 12 is excluded from the electricity taken out from the fuel cell 4 is stored in the electric buffer CAPA.

On the other hand, since the generated electricity of the fuel buffer 4 has been adjusted, the hydrogen gas supplied from the reforming device 2 to the fuel cell becomes surplus. This surplus hydrogen gas is accommodated in the hydrogen buffer MHB in such a manner that it is occluded by the hydrogen occluding alloy in the tank of the hydrogen buffer MHB cooled by the temperature control unit 13 (step S26).

Then, in order to prevent the overflow due to the excessive filling in each of the hydrogen buffer MHB and the electric buffer CAPA, in step S27, the control device 14 checks the remaining quantity in each of the buffers MHB and CAPA. If the remaining quantity has reached 95% (Yes), the quantity of the raw fuel to be supplied is reduced to lower the output from the reforming device 2 (step S28). Thereafter, the processing proceeds to step S10 in FIG. 3.

Figure 6B:
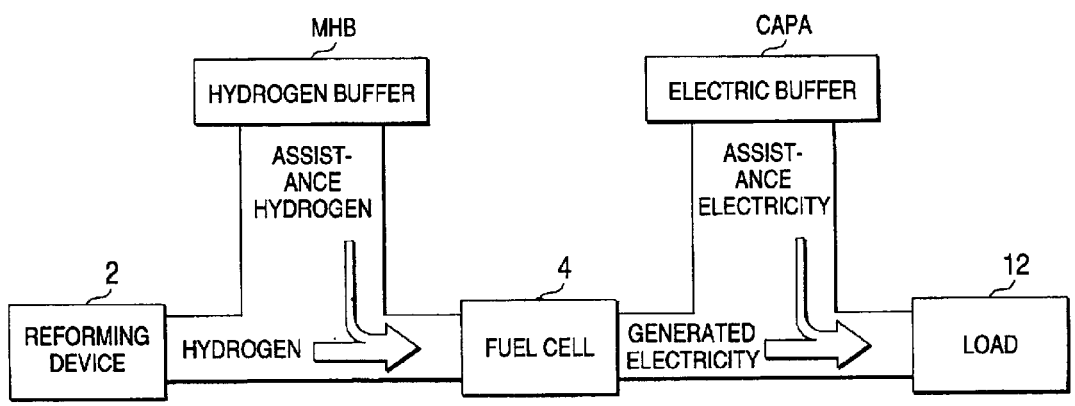
FIG. 6B is a conceptual view of assistance by the hydrogen buffer and the electric buffer.

An explanation will be given of the processing where in step S7 in FIG. 3, the necessary electricity cannot be given by the generated electricity of the fuel cell 4 owing to the hydrogen gas supplied from the reforming device 2 (No). Namely, referring to the flowchart of FIG. 5, the explanation will be given of the processing where as shown in FIG. 6B, the assistance hydrogen gas from the hydrogen buffer MHB is supplied in addition to the hydrogen gas created by the reforming device 2 to increase the electricity generated by the fuel cell 4, and the assistance electricity is added to the generated electricity of the fuel cell 4 to give the necessary electricity.

As seen from FIG. 5, the control device 14 detects the remaining quantity of the hydrogen gas occluded by the hydrogen buffer MHB (step S31), and detects the remaining quantity of the electric energy stored by the electric buffer CAPA (step S32).

In step S33, the control device 14 computes insufficient electricity (or electricity shortage) which is a difference between the generated electricity by the present reforming device 2 and the necessary electricity. In step S34, the control device 14 decides whether or not the insufficient electricity can be given by the action of the electric buffer CAPA and/or the hydrogen buffer MHB. This decision is made by comparing the insufficient electricity with the buffer remaining quantity in the electric buffer CAPA and/or hydrogen buffer MHB multiplied by a coefficient $\alpha$ prescribed for each operating mode.

This coefficient $\alpha$ serves to set the allowance of the remaining quantity according to the operating state. This coefficient intends to prevent the electric energy of the electric buffer CAPA and the occluded hydrogen gas in the hydrogen buffer MHB from being completely consumed for example when abrupt acceleration is continued. Incidentally, the value of the coefficient $\alpha$ becomes smaller in the sequence of a sports mode, normal mode and economy mode.

In step S34, if the insufficient electricity is larger than the buffer remaining quantity of electricity multiplied by the coefficient $\alpha$ (Yes), i.e. the insufficient electricity cannot be given by only the buffer remaining quantity, in step S35, the control device 14 increases the quantity to be supplied of the raw fuel in order to increase the output from the reforming device 2 and thereafter proceeds to step S36. Incidentally, the reason why the control device 14 issues an instruction of increasing the output from the reforming device 2 before assistance by the hydrogen buffer MHB and the electric buffer CAPA is that the low response of the reforming device 2 leads to a time lag until the supplied quantity of the hydrogen gas increases to increase the electricity generated by the fuel cell actually.

On the other hand, if the insufficient electricity is less than the buffer remaining quantity multiplied by $\alpha$ (No), it is not necessary to vary the output from the reforming device 2. Therefore, the processing directly proceeds to step S36.

In step S36, the control device 14 computes the electric energy (assistance quantity) discharged by the electric buffer CAPA and the generated electricity (assistance quantity) of the fuel cell 4 which is to be increased with the aid of the hydrogen gas discharged by the hydrogen buffer MHB, respectively.

In step S37, the control device 14 causes the hydrogen buffer MHB to discharge the hydrogen gas corresponding to the assistance quantity.

Instep S38, the control device 14 causes the electric buffer CAPA to supply the stored electric energy as assistance electricity to the load 12.

The assistance by the hydrogen buffer MHB in step S37 and the assistance by the electric buffer CAPA in step S38 may be executed in any order. Usually, they are executed simultaneously. However, the assistance by the hydrogen buffer MHB, which is first realized after the hydrogen gas has been discharged and the electrochemical reaction by the fuel cell 4 has been made, provides a longer time lag than the assistance by the electric buffer CAPA does.

Figure 7A:
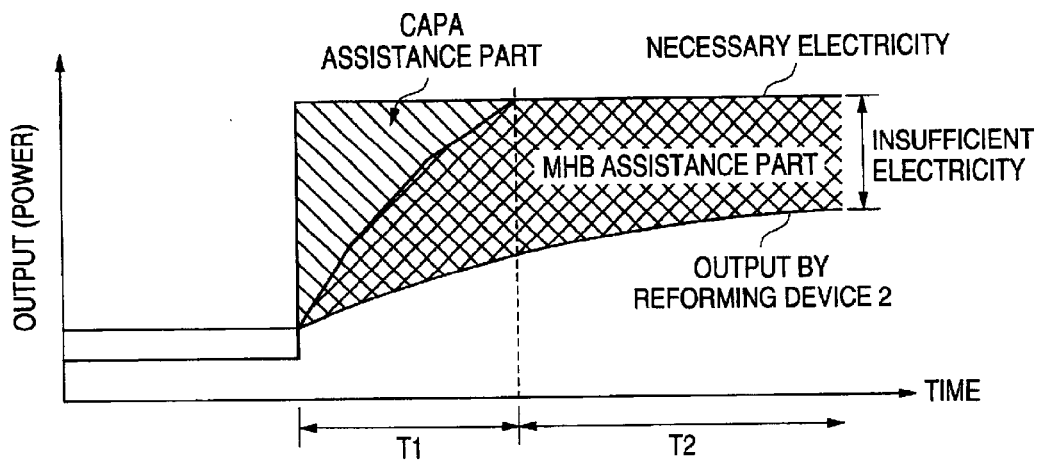
FIG. 7A is a graph showing the case where the necessary electricity is supplied with the assistance of the hydrogen buffer and electric buffer.

For example, where the necessary electricity increases like a step function as shown in FIG. 7A, until the output from the reforming device 2 follows the necessary electricity, the assistance by the electric buffer CAPA which provides higher response is preferentially executed. This assistance by the electric buffer CAPA permits the fuel cell system 1 to supply the necessary electricity swiftly. However, the electric buffer CAPA which has a small energy density maintains the assistance quantity only during a short time T1. At this time, the hydrogen gas gradually discharged from the hydrogen buffer MHB which has started assistance simultaneously with the electric buffer CAPA starts to contribute to the increase in the electricity generated by the fuel cell 4 little by little. During a time zone T2, the insufficient electricity is assisted by the hydrogen buffer MHB. In the meantime, the quantity of the hydrogen gas from the reforming device 2, which has received an instruction of increasing the quantity to be supplied in step S35, starts to increase gradually so that the electricity generated by the fuel cell 4 starts to increase. Finally, the electricity generation by only the reforming device will be executed (not shown).

If the remaining quantity of the electric energy stored in the electric buffer CAPA and the quantity of the hydrogen gas filled in the hydrogen buffer MHB have become less than 30% of their respective quantities by assistance in steps S37 and S38 (Yes in step S39), the output from the reforming device 2 is increased (step S40). Therefore, the processing by the control device 14 returns to step S10 in FIG. 3. On the other hand, if the remaining quantities are still more than the respective capacities after assistance in step S39 (No) the processing directly proceeds to step S10.

Figure 3:
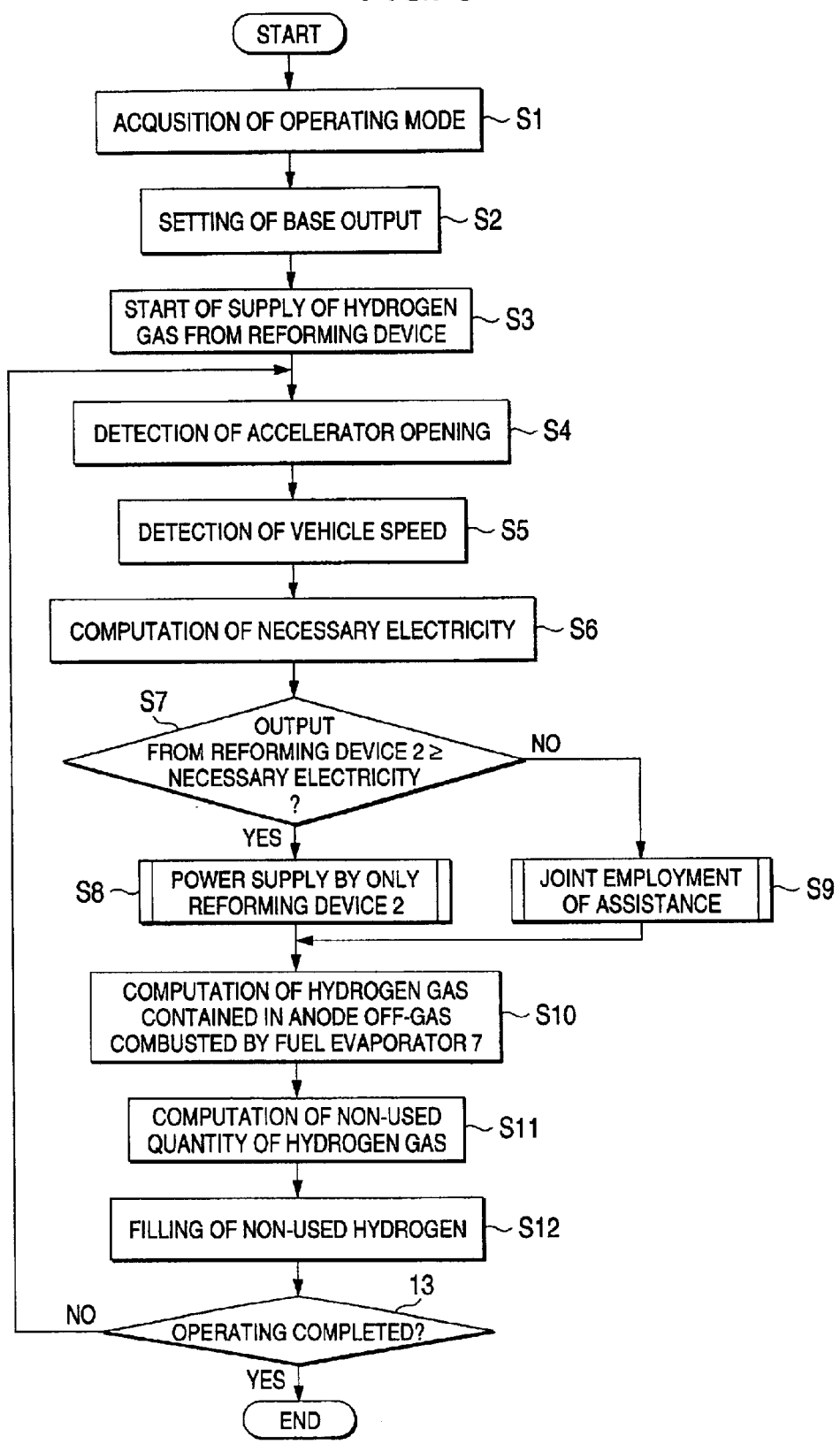
FIG. 3 is a flowchart showing the processing of operating the fuel cell system.
Figure 4:
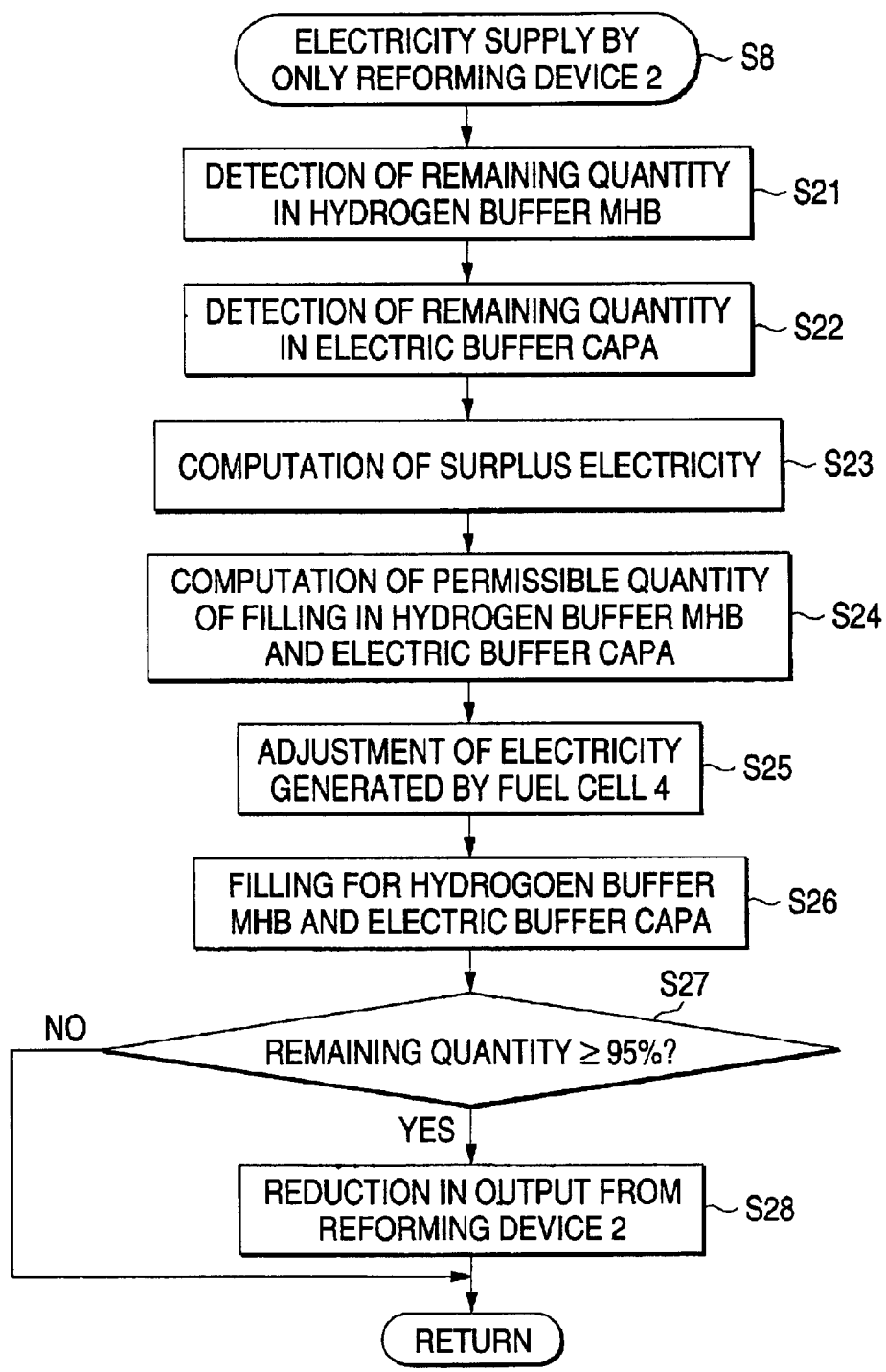
FIG. 4 is a flowchart showing the details of a part of FIG. 3.
Figure 8:
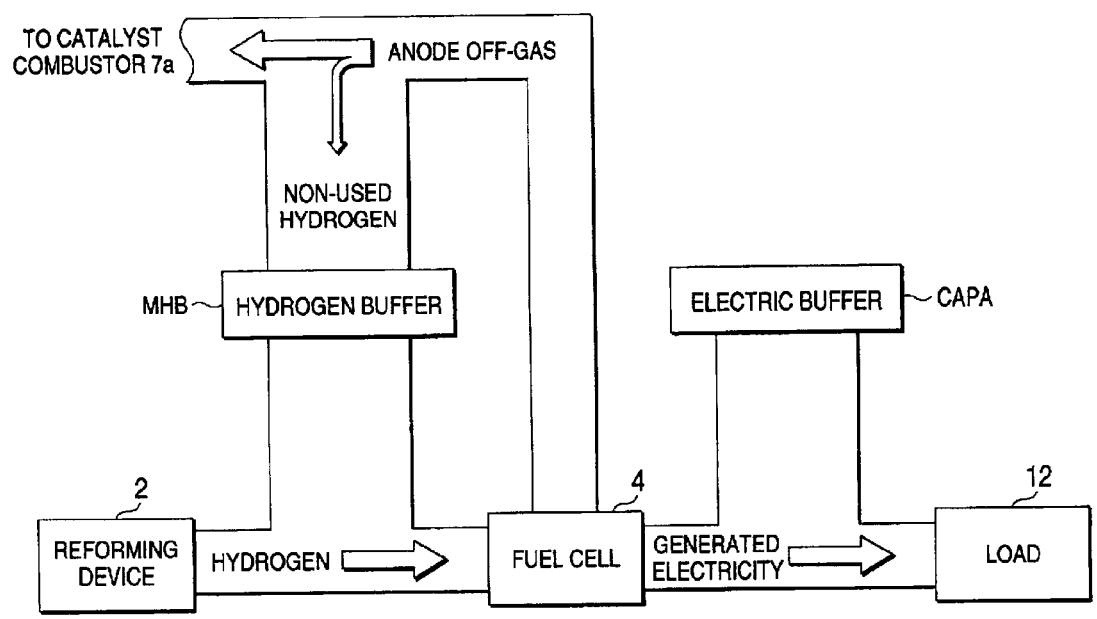
FIG. 8 is a conceptual view of recovering a part of the non-used hydrogen gas contained in the anode-off gas discharged from a fuel cell into the hydrogen buffer.

In step S10 to step S12 in FIG. 3 which are successive to FIGS. 4 and 5, as shown in FIG. 8, a part of the non-used hydrogen gas contained in the anode-off gas, which is discharged from the fuel cell 4 and used as the fuel for evaporating the raw fuel in the fuel evaporator 7, is recovered by the hydrogen buffer MHB.

Specifically, in step S10, the quantity of the anode-off gas (hydrogen gas) necessary to create the heating medium which evaporates the raw fuel in the fuel evaporator 7 is computed.

In step S11, the quantity of the non-used hydrogen gas is computed by subtracting the quantity of the hydrogen gas necessary to create the heating medium from the quantity of the hydrogen gas contained in the anode-off gas. In order to evaporate a large quantity of the raw fuel, a large quantity of heat is required correspondingly. Therefore, the hydrogen gas in the anode-off gas must be subjected to catalytic combustion in the catalyst combustor 7a. Thus, the quantity of the non-used hydrogen gas decreases. Inversely, where a little quantity of the raw fuel is required, a little quantity of heat is required. Therefore, the hydrogen gas for catalytic combustion decreases. As a result, the quantity of the non-used hydrogen gas recovered in the hydrogen buffer MHB increases.

After the quantity of the non-used hydrogen has been computed, the control device 14 opens the valve V1 shown in FIG. 1 to supply the anode-off gas corresponding to the quantity of the non-used hydrogen gas into the hydrogen buffer MHB. Since a condenser (not shown) is located between the valve V1 and the hydrogen buffer MHB, the anode-off gas with the moisture removed flows into the hydrogen buffer MHB so that the hydrogen gas contained in the anode-off gas is occluded (step S12). It should be noted that the moisture is removed to prevent poisoning by the hydrogen occluding alloy.

Then, after the hydrogen buffer MHB is filled with the non-used hydrogen of the anode-off gas, the processing proceeds to step S13. On the basis of the vehicle speed and other detected results, if the control device 14 decides that the driving of the vehicle has been completed (Yes), the processing will be wholly completed. On the other hand, if the control device 14 decides that the driving is continued (No), the processing returns to step S4 so that the processing is repeated.

Where the remaining quantity of each of the hydrogen buffer MHB and the electric buffer CAPA is reduced owing to assistance to the output from the reforming device 2, if the output from the reforming device 2 is larger than the necessary electricity, in step S8 (i.e. steps S21 to S28), the hydrogen buffer MHB is filled with the hydrogen gas and the electric buffer CAPA is filled with the electric energy to provide for the next increase in the necessary electricity.

Figure 7B:
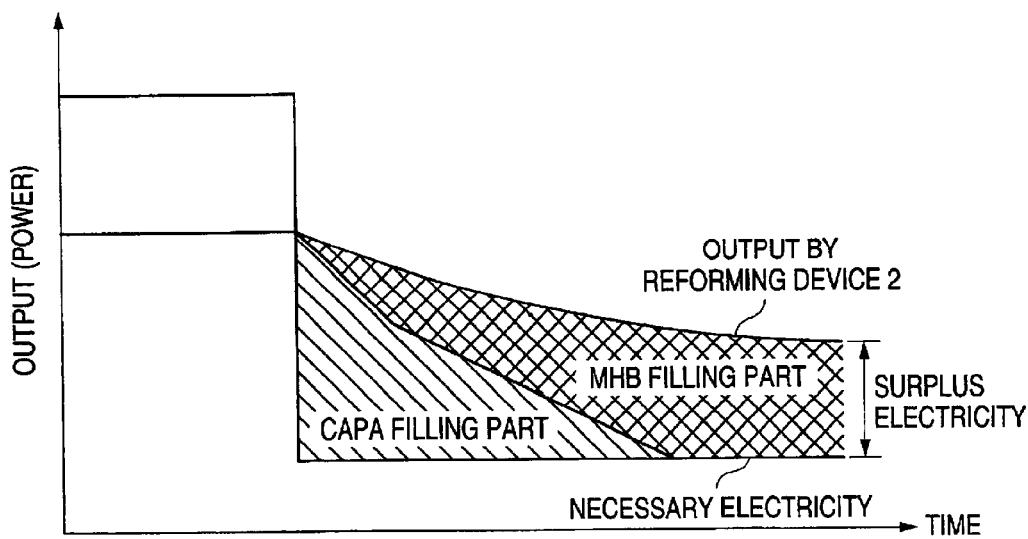
FIG. 7B is a graph showing the filling for the hydrogen buffer and electric buffer when the necessary electricity decreases.

For example, as shown in FIG. 7B, while the output from the reforming device 2 decreases to the necessary electricity, a part of the surplus electricity is filled (stored), and the surplus hydrogen gas corresponding to the remaining surplus electricity is accommodated (filled) in the hydrogen buffer MHB.

Figure 9:
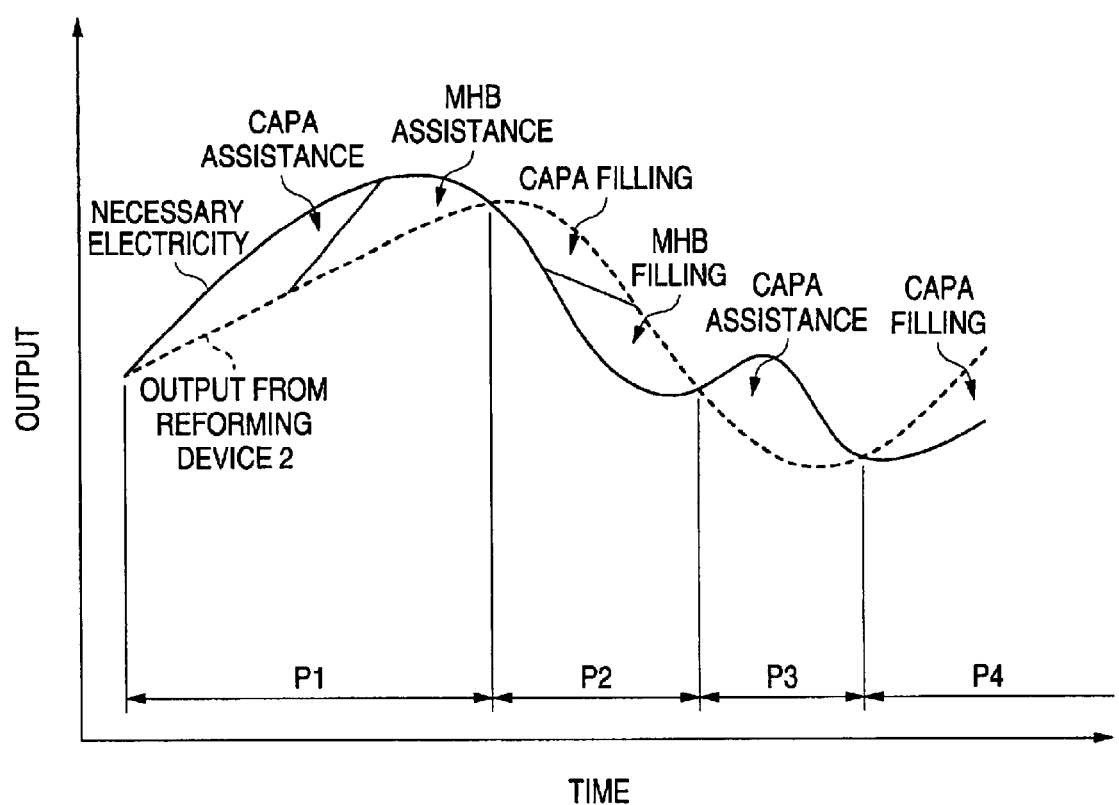
FIG. 9 is a graph showing the operating state of a fuel cell system where the necessary electricity varies continuously.

Further, where the increase/decrease in the necessary electricity is done irregularly and continuously as shown in FIG. 9, the assistance and filling are repeated as the occasion demands. Specifically, where the output from the reforming device 2 as indicated by broken line is smaller than the necessary output as indicated by solid line (time zone of P1), the assistance by the electric buffer CAPA and hydrogen buffer MHB are employed. Inversely, where the output from the reforming device 2 is larger than the necessary output (time zone of P2), the electric buffer CAPA and the hydrogen buffer MHB are filled with the surplus electricity and surplus hydrogen gas. Further, where there is a small difference between the output from the reforming device 2 and the necessary output, the assistance by only the electric buffer CAPA (time zone of P3) or the filling by only the electric buffer CAPA (time zone of P4) is selectively performed as the occasion demands.

The fuel cell system 1 as described above can exhibits the high response to the increase in the necessary electricity by appropriately controlling the assistance and filling by the hydrogen buffer MHB and electric buffer CAPA. In addition, by controlling the quantity of assistance by the hydrogen buffer MHB and the electric buffer CAPA, a change in the quantity treated by the reforming device 2 can be minimized. On the other hand, even where the quantity to be treated by the reforming device is changed, the necessary electricity can be supplied with no abrupt change so that the burden on the reforming device 2 can be relaxed.

Further, the effective employment of the surplus electricity permits the fuel cell 4 to be miniaturized and the employment of the hydrogen buffer MHB permits the electric buffer CAPA with a low energy density and the fuel evaporator 7 to be miniaturized. Thus, the fuel cell system 1 can be miniaturized. Furthermore, by causing the hydrogen buffer MHB to occlude the non-used hydrogen gas contained in the anode off-gas discharged from the fuel buffer 4, the employment efficiency of the hydrogen gas can be improved.

Incidentally, this invention can be modified more widely without being limited to the embodiment described above.

For example, the hydrogen buffer MHB should not be limited to the hydrogen occluding alloy as long as it can occlude and discharge. The electric buffer CAPA should not be limited to the electric double layer capacitor as long as it cans charge/discharge electricity.

In accordance with the invention described in claim 1 or 6 of this application, by supplementing the insufficient electricity with the hydrogen buffer and/or the electric buffer or filling the surplus electricity or surplus hydrogen gas in the hydrogen buffer or electric buffer, the energy can be effectively employed. Therefore, the system can be reduced in weight and size. The fuel efficiency of the vehicle can be employed.

In accordance with the invention described in claim 2 or 5, by preferentially employing the electric buffer with high response, the response to a change in the necessary electricity can be enhanced. Therefore, burden is not cast on the driver.

In accordance with the invention described in claim 3, by combining the assistance by the electric buffer with a small energy density with the assistance by the hydrogen buffer with low response but with an energy density, the electricity can be supplied stably.

In accordance with the invention described in claim 4 or 6, by supplementing an increase in the necessary electricity during a transient period with the electric buffer or hydrogen buffer and thereafter increasing the quantity of the hydrogen gas supplied from the reforming device, stable electricity supply can be maintained.

What is claimed is:

1. A fuel cell system comprising:
   a fuel cell supplying to a load an electricity generated by an electrochemical reaction of a hydrogen gas and an oxygen gas;
   a reforming device for generating the hydrogen gas to be supplied to the fuel cell by a reforming reaction;
   a hydrogen buffer for accommodating a part of the hydrogen gas supplied from the reforming device; and
   an electric buffer for charging a part of the electricity supplied from the fuel cell,
   wherein the hydrogen gas necessary for generating the electricity in the fuel cell is served by a hydrogen gas supplied from the hydrogen buffer and the reforming device, and
   the electricity necessary for the load is served by a electricity supplied from the electric buffer and the electricity from the fuel cell.

2. The fuel cell system according to claim 1, wherein when the electricity necessary for the load increases, a discharge of the electricity supplied from the electric buffer is performed prior to a discharge of the hydrogen from the hydrogen buffer.

3. The fuel cell system according to claim 1, wherein the hydrogen gas is discharged from the hydrogen buffer in response to a remaining quantity of an electric energy stored in the electric buffer.

4. The fuel cell system according to claim 1, wherein the hydrogen gas is discharged from the reforming device in response to a remaining quantity of the hydrogen gas accommodated in the hydrogen buffer.

5. The fuel cell system according to claim 1, wherein the hydrogen buffer includes a plurality of tanks for occluding/discharging the part of the hydrogen gas and a temperature control unit, and the temperature control unit controls to keep at least one of the tanks in the dischargeable state.

6. A method of operating a fuel cell system, the method comprising the steps of:
   (a) supplying an electricity generated by an electrochemical reaction of a fuel cell by a hydrogen gas and an oxygen gas to a load, the hydrogen gas being obtained from a reforming reaction in a reforming device;
   (b) charging or discharging in an electric buffer a electricity corresponding to an excess/shortage of a electricity supplied from the fuel cell and a necessary electricity consumed by the load;
   (c) charging or discharging the hydrogen gas corresponding to an excess/shortage in a necessary quantity of a hydrogen gas for the fuel cell and a quantity of a hydrogen gas supplied from the reforming device in a hydrogen buffer accommodating a hydrogen occluding alloy; and
   (d) increasing a quantity of the hydrogen gas supplied from the hydrogen buffer to the fuel cell after increasing the electricity from the electric buffer to the load, when the necessary electricity increases, to thereby increase a electricity generated by the fuel cell for serving the necessary electricity.

7. The method of operating the fuel cell system according to claim 6, further comprising the step of:
   (e) increasing the quantity of the hydrogen gas supplied from the reforming device after increasing the quantity of the hydrogen gas supplied from the hydrogen buffer to thereby increase the electricity generated by the fuel cell for serving the necessary electricity.

* * * * *